United States Patent

[11] 3,628,809

| [72] | Inventor | John Cirillo<br>Nutley, N.J. |
|---|---|---|
| [21] | Appl. No. | 862,687 |
| [22] | Filed | Oct. 1, 1969 |
| [45] | Patented | Dec. 21, 1971 |
| [73] | Assignee | Walter Kidde & Company, Inc.<br>Belleville, N.J. |

[54] PASSENGER SAFETY APPARATUS FOR VEHICLES
13 Claims, 3 Drawing Figs.

[52] U.S. Cl. .................................................. 280/150 AB,
137/38, 137/48
[51] Int. Cl. ............................................... B60r 21/08
[50] Field of Search ........................................ 280/150
AB; 222/3; 137/38, 45, 48; 296/84 K

[56] References Cited
UNITED STATES PATENTS

| 2,755,125 | 7/1956 | Hodges | 280/150 AB X |
|---|---|---|---|
| 2,760,484 | 8/1956 | Ferwerda | 137/38 X |
| 2,806,737 | 9/1957 | Maxwell | 296/84 K |
| 2,834,609 | 5/1958 | Bertrand | 280/150 AB |
| 2,899,214 | 8/1959 | D'Antini | 280/150 AB |

*Primary Examiner*—Benjamin Hersh
*Assistant Examiner*—John A. Pekar
*Attorney*—Darby & Darby

ABSTRACT: Apparatus for protecting an occupant of a vehicle during a collision by inflating a bag to cushion and restrain the occupant. The pressure vessel for inflating the bag is provided with an outlet opening connected to the bag and an open-ended tubular section aligned with the outlet opening. A valve member is positioned in the outlet opening and a piston positioned in the tubular section is connected to the valve member to balance the greater portion of the pressure force acting on the valve member. The piston carries a mass to move the valve member and open the outlet in response to a predetermined rate of change of speed. The tubular section of the container is adapted to extend into the engine compartment of the vehicle and the piston carries a pressure gauge and a valved fill port so that the container can be serviced from the engine compartment.

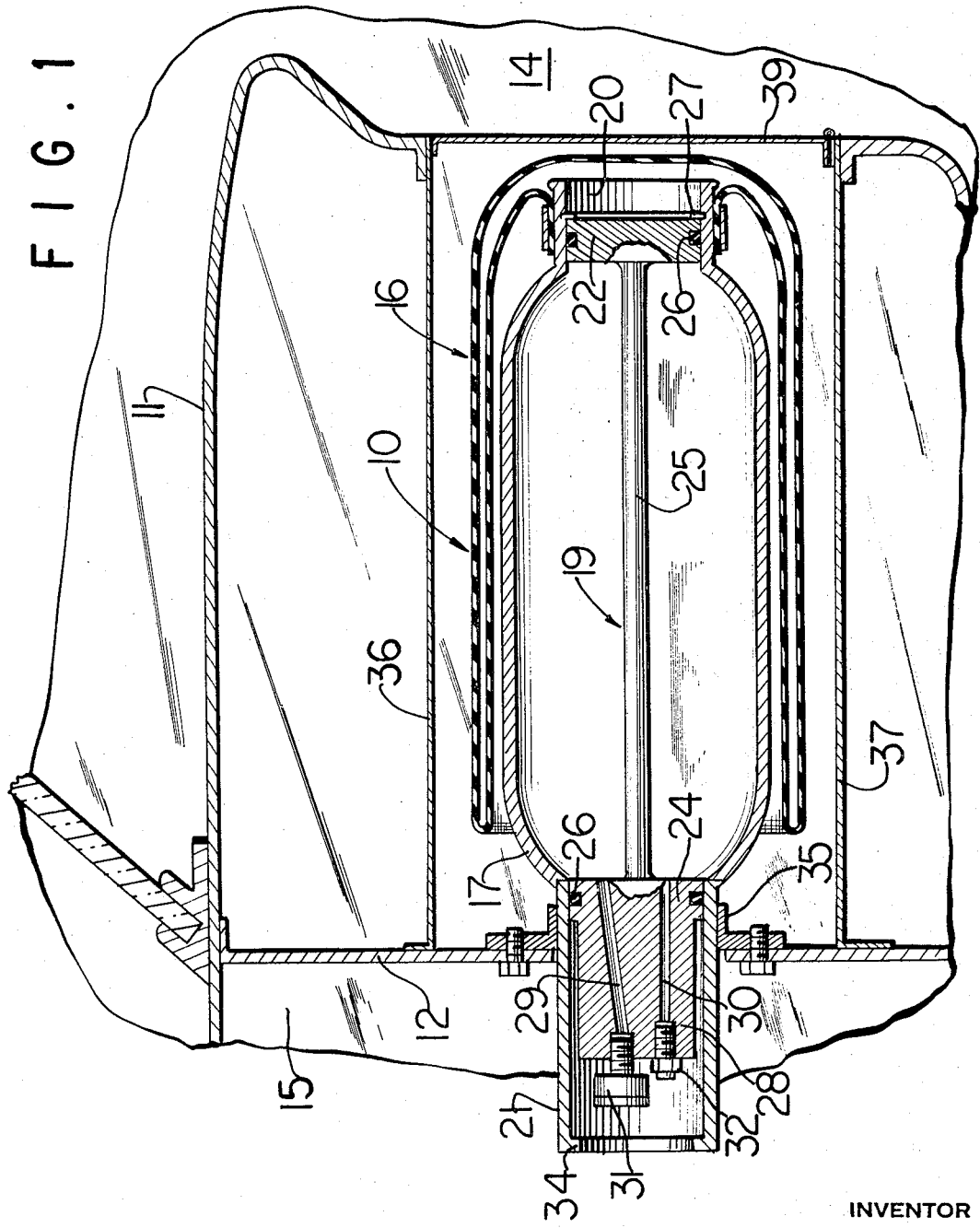

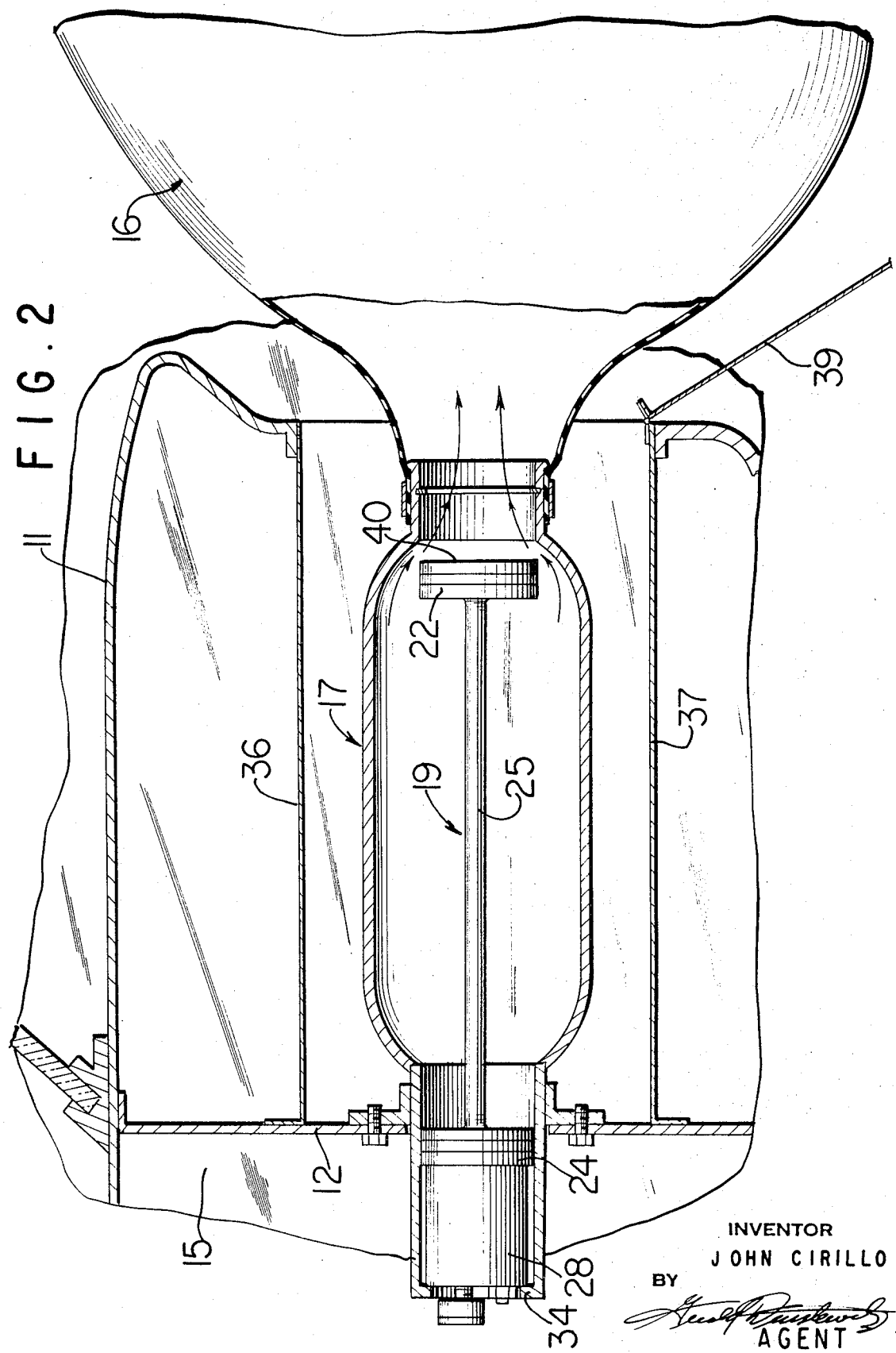

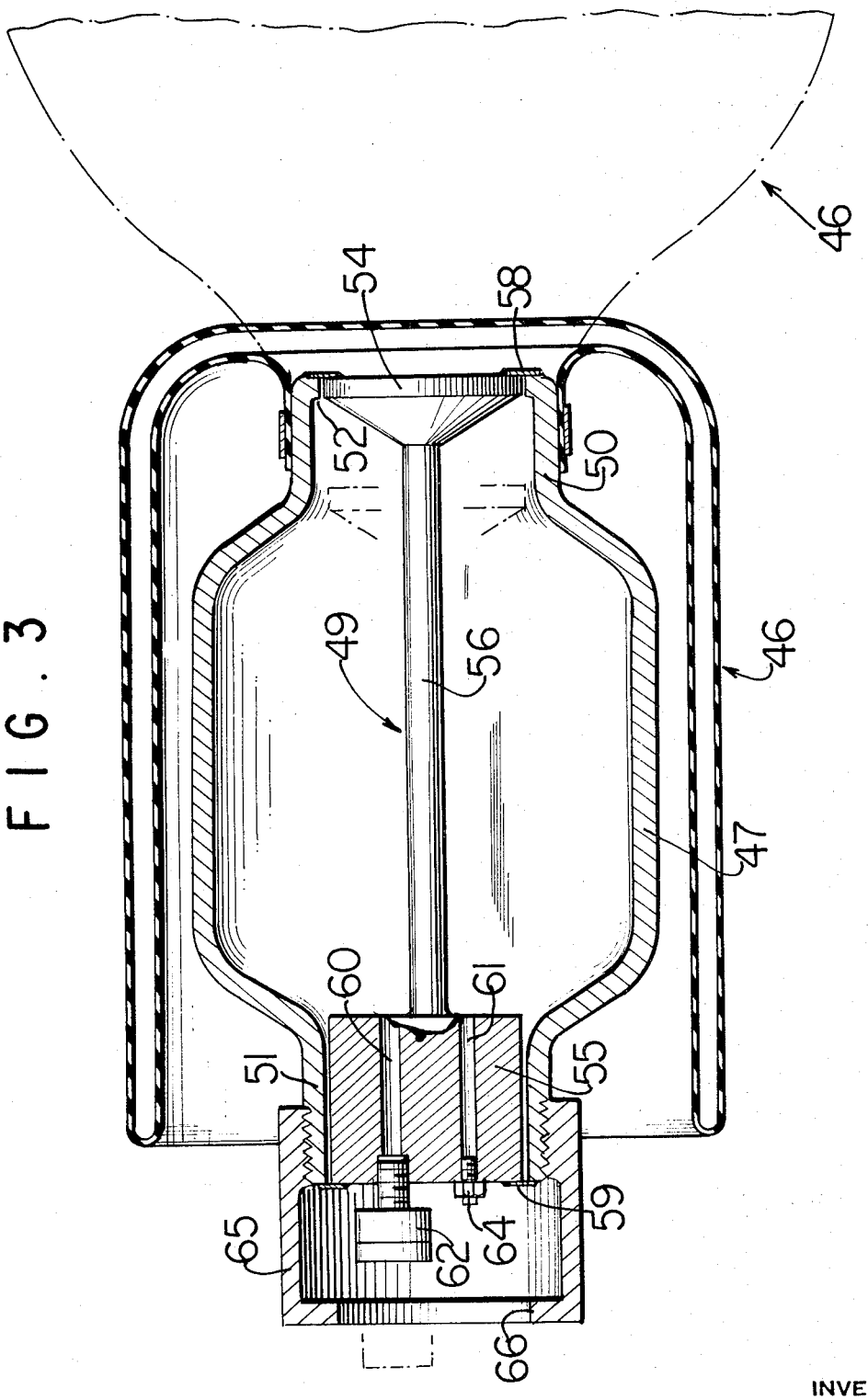

PASSENGER SAFETY APPARATUS FOR VEHICLES

BACKGROUND OF THE INVENTION

The present invention relates to vehicle safety apparatus, and, more particularly, to apparatus for protecting an occupant of a vehicle during a collision by inflating a bag to restrain and cushion the occupant.

In recent years a great deal of attention has been devoted to safety systems and devices for protecting the occupants of passenger vehicles, particularly automobiles. One type of system which is currently being given serious consideration employs an inflatable bag or envelope which is stored in a deflated condition, usually in front of the occupant (for example under the dashboard of an automobile). When the vehicle experiences very rapid deceleration such that the occupant would be thrown forward (for example against the dash or windshield), gas stored under pressure is automatically released and the bag is inflated to restrain and cushion the occupant.

A system of this type must operate very quickly. The bag must be inflated in milliseconds after a sudden impact if the occupant is to be protected. The systems which have been previously proposed have employed electrically detonated explosive charges for rapidly releasing the stored gas. The explosive charge is connected to an electrical circuit which includes an inertia responsive electrical switch that closes in response to a predetermined rate of deceleration.

Although a number of these systems have been developed and successfully tested, they have not been put to general practice because of their high cost. The explosive valve, the inertia responsive switch, and the associated electrical circuit, which have been considered essential for fast operation, represent a substantial portion of this cost.

SUMMARY

Accordingly, it is an object of this invention to provide safety apparatus of the foregoing type which is both low in cost and fast acting.

Another object is to provide such apparatus wherein the pressure vessel contains an inexpensive fast-acting inertia actuated valve.

Another object is to provide such apparatus which is easily and conveniently serviced.

The foregoing objects are provided by apparatus of the type discussed above wherein the pressure vessel has an outlet connected to the inflatable bag, a valve member at the outlet, means for balancing at least a substantial portion of the fluid pressure force acting on the valve member, and an actuating mass connected to the valve member for moving the valve member in response to deceleration at a predetermined rate.

BRIEF DESCRIPTION OF THE DRAWINGS

A preferred embodiment of the invention has been chosen for purposes of illustration and description, and is shown in the accompanying drawings, forming a part of the specification, wherein:

FIG. 1 is a sectional view of apparatus according to the present invention shown positioned under the dashboard of an automobile in its normal or unoperated condition.

FIG. 2 is a sectional view of the apparatus of FIG. 1 in its operated condition.

FIG. 3 is a sectional view of another embodiment of the invention wherein the pressure vessel is hermetically sealed.

DESCRIPTION OF THE PREFERRED EMBODIMENTS

Referring to FIG. 1 of the drawings there is shown a passenger safety apparatus 10 positioned beneath the dashboard 11 of an automobile and bolted to the firewall 12 which separates the passenger compartment 14 from the engine compartment 15.

The safety apparatus 10 includes an inflatable bag 16, a pressure vessel 17 for storing gas to inflate the bag 16 in the event of a collision, and an inertia responsive valving unit 19 within the pressure vessel.

The pressure vessel 17 is generally cylindrical and is provided with an outlet 20 facing the passenger compartment and an open ended tubular section 21 extending through the firewall into the engine compartment. The inflatable bag 16 is attached to the outlet 20 of the pressure vessel.

The valving unit 19 includes a valve member piston 22 within the outlet 20, a balancing piston 24 within the tubular section 21 and a rod 25 connecting the valve member 22 and the piston 24. The pistons 22 and 24 are each provided with an O-ring seal 26. The valve member piston 22 is of slightly larger diameter than the piston 24 and the unit 19 is urged toward the outlet by a force proportional to the difference in the piston areas. A snapring 27 is positioned in a groove within the mouth of the outlet to engage and hold the piston 22 against this force.

The piston 24 carries a cylindrical formation 28 having a mass which is related to the resultant force acting on the unit 19 so that the valve member piston 22 is moved out of the outlet in response to deceleration of the vehicle at a rate dangerous to the passengers. A pair of passageways 29 and 30 extend longitudinally through the formation 28 and the piston 24 to the interior of the container. A pressure gauge 31 and a fill valve 32 are fitted into the outer ends of the passageways 29 and 30 respectively. The pressure gauge 31 and the fill valve 32 are positioned within the engine compartment 15. Therefore, whenever the automobile is serviced the pressure within the pressure vessel 17 may be easily checked and additional pressure may be conveniently introduced by means of the fill valve if necessary.

The tubular section 21 is provided with an inwardly directed flange 34 for limiting the motion of the valving unit 19. An annular flange 35 is welded to the opposite end of the section 21 for bolting the pressure vessel to the firewall 12.

The apparatus 10 is shown enclosed by a fiberboard housing including an upper wall 36, a lower wall 37, and a closure member 39 pivotally attached to the lower wall.

Referring now to FIG. 2, when the automobile is subjected to rapid deceleration, for example in the event of a collision, the inertia of the formation 28 overcomes the fluid pressure force holding the piston 22 against the split ring 27 and drives the valving unit 19 forward (to the left as shown in the drawings) to open the outlet 20. The forward motion of the valving unit is accelerated by the flow of gas through the outlet to place the valving unit in a fully opened position in a very short time. As the piston 22 moves out of the outlet 22, the gas which then flows into the outlet exerts a pressure on the rearwardly facing surface 40 of the piston 22. This pressure helps to drive the valving unit 19 forward and holds the unit in its forward position during the inflation period.

As the bag 16 inflates, it forces the closure 39 open and expands in front of the passenger to prevent forward motion of the passenger. The bag may be provided with blowout patches (not shown) to insure rapid deflation thereof after it has accomplished its function of protecting the passenger during the period of dangerous deceleration.

In FIG. 3 there is shown another embodiment of the invention which includes an inflatable bag 46, a pressure vessel 47, and a valving unit 49.

The pressure vessel 47 is generally cylindrical and is provided with a neck 50 on one end and a smaller diameter neck 51 on the other end in axial alignment with the neck 50. An inwardly directed annular flange 52 is provided at the mouth of the neck 50 and has an inner diameter equal to the inner diameter of the neck 51.

The valving unit 49 includes a piston 54 positioned in the mouth of the neck 50, a piston 55 positioned within the neck 51 and a rod 56 connecting the pistons 54 and 55.

The pressure vessel 47 is hermetically sealed by means of sealing rings 58 and 59. The sealing ring 58 covers the annular space between the flange 52 and the piston 54. The outer edge of the ring is welded to the flange and its inner edge is welded to the piston. The sealing ring 59 covers the annular space between the neck 51 and the piston 55 with the outer edge of the ring being welded to the neck and the inner edge being welded to the piston.

The pistons 54 and 55 are of equal diameter and the piston 55 has sufficient length to provide the necessary mass to shear the sealing rings 58 and 59 in response to deceleration at a dangerous rate. The piston 55 is provided with longitudinally extending passageways 60 and 61. A pressure gauge 62 is fitted into the forward end of the passageway 60 to indicate that the pressure in the vessel 47 is at the prescribed level. A fill valve 64 is fitted into the forward end of the passageway 61 for the purpose of initially pressurizing the vessel.

An annular extension 65 is threaded in the neck 51 and is provided with an inwardly directed flange 66 for limiting the forward motion of the valving unit 49. The pressure vessel 47 may be mounted in an automobile with the neck 51 extending through the engine firewall thereof so that the pressure gauge is readily accessible from the engine compartment.

In operation, when the apparatus experiences a deceleration at a dangerous rate, the inertia of the piston 55 drives the unit 49 forward shearing the sealing rings 58 and 59. As described in connection with FIG. 2, the gas flowing through the mouth of the neck 50 aids in driving the unit 49 forward. The flange 66 on the extension 65 engages the outer end of the piston 55 to retain the inner portion of the piston within the neck 51 and thus limit the flow from the neck 51. The forward motion of valving unit 49 fully opens the mouth of the neck 50 so that the gas in the vessel 47 flows rapidly into the bag 46 with little loss around the piston 55.

It will be seen from the foregoing that the herein before stated objects and others are accomplished by the present invention and that new and improved vehicle safety apparatus for protecting an occupant against injury during a collision has been provided.

I claim:

1. Apparatus for protecting an occupant of a vehicle, said apparatus comprising:
    an inflatable device to cushion and restrain the occupant when said device is inflated;
    a container for holding a fluid medium under pressure for inflating the inflatable device, said container having an outlet connected to an inlet of said inflatable device;
    valve means in said container movable to seal said outlet;
    said valve means including first means having a pressure surface communicating with the fluid medium for producing a first force in response to the pressure of the fluid to move said valve means in a direction to effect the seal;
    second means connected to said valve means and having a pressure surface communicating with the fluid medium for producing a second force in response to the pressure of the fluid at least partially to offset the effect of the fluid pressure on said first means, said second force having a maximum value substantially the same as said first force; and
    an inertia responsive mass connected to said valve means and responsive to not less than a predetermined rate of change of velocity of the vehicle to move said valve means to open the outlet, to permit the pressurized fluid to move into the said inflatable device to inflate said device.

2. Apparatus as in claim 1 further comprising means connected to said container for releasably holding said valve means in sealing relationship with said outlet.

3. The aPparatus of claim 2 wherein said holding means comprises at least one retaining element secured to said container and to said valve means to effect the seal, said element being adapted to shear to free said valve means upon movement of said inertia responsive means in response to said predetermined rate of change of velocity.

4. A The apparatus of claim 1 wherein said second means is formed as part of said inertia responsive mass and further comprising a tubular section formed on said container, said section having an inner end open to the fluid medium, said inertia responsive mass being located within said section.

5. The apparatus of claim 4 wherein said first means of said valve means comprises a first piston member having means for effecting a fluidtight seal of said container outlet.

6. The apparatus of claim 5 wherein said second means comprises a second piston member located within said tubular section, said section piston having means for effecting a fluidtight seal of said section.

7. Apparatus according to claim 6 wherein said inertia responsive mass is carried by said second piston member.

8. The apparatus of claim 7 wherein the area of the pressure surface of said first piston member is greater than the area of the pressure surface of said second piston member.

9. Apparatus according to claim 8 wherein means for indicating the pressure in said container are carried by said second piston member so as to be accessible from the outer end of the tubular section.

10. Apparatus according to claim 9 wherein means for introducing fluid medium under pressure into said container are carried by said second piston member so as to be accessible from the outer end of said tubular section.

11. Apparatus according to claim 10 wherein said tubular section projects outwardly from said container to extend from the passenger compartment of the vehicle into a service compartment of the vehicle.

12. Apparatus as in claim 11 wherein said tubular section is positioned at one end of said container, the outlet of said container being positions at the other end substantially in alignment with said tubular section.

13. Apparatus as in claim 12, further comprising a substantially rigid elongated shaft member, one end of said shaft being connected to said first piston and the other end being connected to said second piston, said shaft extending substantially longitudinally through the center of said container.

* * * * *